(12) United States Patent
Graube

(10) Patent No.: US 6,525,915 B1
(45) Date of Patent: Feb. 25, 2003

(54) ADAPTIVE CURRENT SOURCE FOR NETWORK ISOLATION

(75) Inventor: Maris Graube, Forest Grove, OR (US)

(73) Assignee: Relcom, Inc., Forest Grove, OR (US)

( * ) Notice: Subject to any disclaimer, the term of this patent is extended or adjusted under 35 U.S.C. 154(b) by 0 days.

(21) Appl. No.: 09/329,861

(22) Filed: Jun. 11, 1999

(51) Int. Cl.⁷ .............................................. H02H 9/00
(52) U.S. Cl. .................................... 361/58; 340/310.01
(58) Field of Search ................ 361/18, 58; 340/310.01, 340/310.03, 310.06, 310.08

(56) References Cited

U.S. PATENT DOCUMENTS

| | | | | |
|---|---|---|---|---|
| 5,179,488 A | * | 1/1993 | Rovner | 361/58 |
| 5,391,932 A | * | 2/1995 | Small et al. | 340/310.08 |
| 5,412,369 A | * | 5/1995 | Kirchner | 340/310.03 |
| 5,424,710 A | * | 6/1995 | Baumann | 340/310.01 |
| 5,448,231 A | * | 9/1995 | Takezoe et al. | 340/310.01 |
| 5,610,552 A | * | 3/1997 | Schlesinger et al. | 327/560 |
| 5,929,623 A | * | 7/1999 | Hoshino | 323/315 |
| 5,936,514 A | * | 8/1999 | Anderson et al. | 340/310.01 |
| 5,963,147 A | * | 10/1999 | Westfield et al. | 340/870.11 |

OTHER PUBLICATIONS

Fieldbus Standard for Use in Industrial Control Systems By the Instrument Society of America 96 pages, Sep., 1992.

* cited by examiner

Primary Examiner—Josie Ballato
Assistant Examiner—Roberto Rios
(74) Attorney, Agent, or Firm—Chernoff, Vilhauer, McClung & Stenzel, LLP

(57) ABSTRACT

Fieldbus is a digital, two-way communication link for remotely located sensors, controllers and actuators used in industrial applications. The fieldbus simultaneously carries a digital signal for communication with devices attached to the bus and DC power to operate those devices. Unless isolated from the fieldbus, the constant voltage DC power supply would prevent the propagation of the varying voltage of the digital communication signals on the fieldbus. An adaptive current source is provided between the output the constant voltage power supply and the fieldbus wiring to isolate the power supply. The adaptive current source can also be used to isolate the input of DC/DC voltage converters providing power to devices attached to the fieldbus.

10 Claims, 6 Drawing Sheets

ADAPTIVE CURRENT SOURCE FOR NETWORK ISOLATION

BACKGROUND OF THE INVENTION

The present invention relates to a power conditioner for a DC power supply for a fieldbus network and, more particularly, to an adaptive current source to isolate a DC power supply from a communication bus simultaneously carrying digital communication signals and DC power to attached devices.

In a typical industrial plant application, sensors measure position, motion, pressure, temperature, flow, and other parameters related to the operation of process machinery and activities. Actuators, such as valves and motor controllers, control the operation of the machinery and process activities. The sensors and actuators are remotely located from the human and computerized controllers which gather information from the sensors and direct operation of the actuators. A communication network links the controllers with the sensors and actuators located in the field.

Heretofore, communication between controllers and remote sensors and actuators in industrial applications has been by means of analog signaling. The prevailing standard for analog networking of field devices and the control room in industrial applications has been the Instrument Society of America standard, ISA S50.1. This ISA standard provides for a two wire connection between the controller and each field device. One wire of the system carries the analog signal between the remote device and the controller. The analog signal may be converted to a digital signal useful to a computerized controller. The second wire of the circuit supplies DC power for operation of the remote sensor or actuator.

Communication utilizing digital signaling reduces the susceptibility of the communication system to noise and provides a capability for conveying a wide range of information over the communication network. Digital communication also permits several different devices to communicate over a single pair of wires. Remote devices used in connection with a digital communication system typically incorporate local "intelligence." This permits sensors and actuators to perform diagnostic, control, and maintenance functions locally. Further, the local intelligence permits the devices to communicate directly with each other and perform some functions without the necessity of involving a central control facility, thus promoting the development of distributed control systems.

Fieldbus is a generic term used to describe a digital, bidirectional, multidrop, serial communication network for connecting isolated field devices, such as controllers, actuators and sensors, in industrial applications. One such fieldbus is defined by the Instrument Society of America standard, ISA SP50.02. This system utilizes a two wire bus to provide simultaneous digital communication and DC power to remotely located devices.

While fieldbus installations are as varied as the industrial applications with which they are used, an exemplary fieldbus installation is illustrated in FIG. 1. A twisted pair cable, referred to as the home run 2, connects a digital control system 4 and a DC power supply 6 with a number of devices 8 (actuators, sensors and local controllers) in the field. The digital control system 4 and the DC power supply 6 may be located in a control room 10. On the other hand, the power supply 6 could be located in the field or at a marshaling panel. The development of the digital fieldbus may also mean that controllers are located in the field. Several devices 8 can be connected to the home run 2 by spur cables 14 at a terminal referred to as a chicken foot 12 which incorporates signal termination for the home run. In addition, devices can be connected along the home run cable 2 with spur cables 14 that are connected to the home run by spur connectors 13.

Termination is required at each end of the home run 2. To send a digital signal over the network, a connected device varies the amount of current it draws from the bus. The terminators 16 comprise a resistor 18 of approximately the characteristic impedance of the wires of the bus and a capacitor 20 connected in series across the pair of wires of the home run cable 2. When the transmitting device varies the current drawn from the bus, the voltage drop across the terminating resistor 18 varies producing the varying voltage of the digital signal. The capacitor 20 of the terminator 16 prevents dissipation of the DC power through the terminator resistor 18 while permitting transmission of the high frequency digital signal on the bus. In addition, the terminators 16 serve to prevent signals from reflecting from the ends of the home run wires 2.

A power conditioner 22 is necessary to isolate the DC power supply 6 from the bus. The constant voltage power supply 6 will attempt to maintain a constant output voltage. This would prevent the propagation of the varying voltage of the digital signal if the power supply 6 was connected directly to the bus. Typically, the power conditioner 22 comprises an inductor and a resistor in series with the output of the power supply 6. The inductor allows a DC voltage to be conducted to the bus, but blocks the high frequency digital communication signals from the output of the power supply 6. The combination of an inductor in the power conditioner 22 and the capacitors 20 in the terminators 16 may make the network "ring" or oscillate disrupting signals on the network. A resistor in series with the inductor of the power conditioner 22 is used to critically damp the circuit to prevent oscillation. While a power conditioner 22 based on an inductor and resistor is effective in isolating the DC power supply, if a reasonable amount of current is to be supplied to the network the inductor must be physically large to avoid saturation of the magnetic material from which it is constructed and, as a consequence, will be costly. In addition, the DC current for the network flows through the series resistor of the power conditioner 22 dissipating power which would otherwise be available to the devices connected to the network.

Further, it may be desirable to provide multiple power supplies, particularly for large networks with long wiring runs. The resistance of the long wiring runs may dissipate sufficient power to make powering the network from one power source impractical. The tendency of the inductor isolated circuit to ring and the difficulty of designing a circuit with muWiple inductor-based isolators makes multiple power sources extremely difficult to incorporate in the fieldbus network.

What is desired, therefore, is a compact and efficient apparatus, adaptable to the power needs of a wide variety of installations, for isolating the output a DC power supply from voltage fluctuations on a bus simultaneously carrying digital communication signals and DC power.

SUMMARY OF THE INVENTION

The present invention overcomes the aforementioned drawbacks of the prior art by providing an apparatus for isolating the output of a constant voltage power source from a voltage variation in an electrical circuit connected to the output comprising a current source interposed between the output of the power source and the electrical circuit. The current source provides a variable resistance conductive path for current flow from the output of the power source to the wiring of a fieldbus circuit. The current source can provide a fixed current output or can be constructed to provide current output-that is adaptable to relatively slow changes in the current requirements of the fieldbus circuit while isolating the output of the power supply from the relatively high frequency digital signals on the bus.

The present invention also provides an apparatus for isolating the input of a direct current voltage converter from voltage variation in the electrical circuit supplying power to the input of the voltage converter comprising a current source interposed between the input of the voltage converter and the electrical circuit.

The adaptive current source has the circuit appearance of a large impedance and permits DC current to pass through the current source while isolating the low impedance constant voltage power supply or, as the case may be, the DC/DC voltage converter from the relatively high frequency digital communication signals on the bus. The current source is more compact and efficient than inductor-based power supply isolators and avoids signal distortion due to ringing in the circuit.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
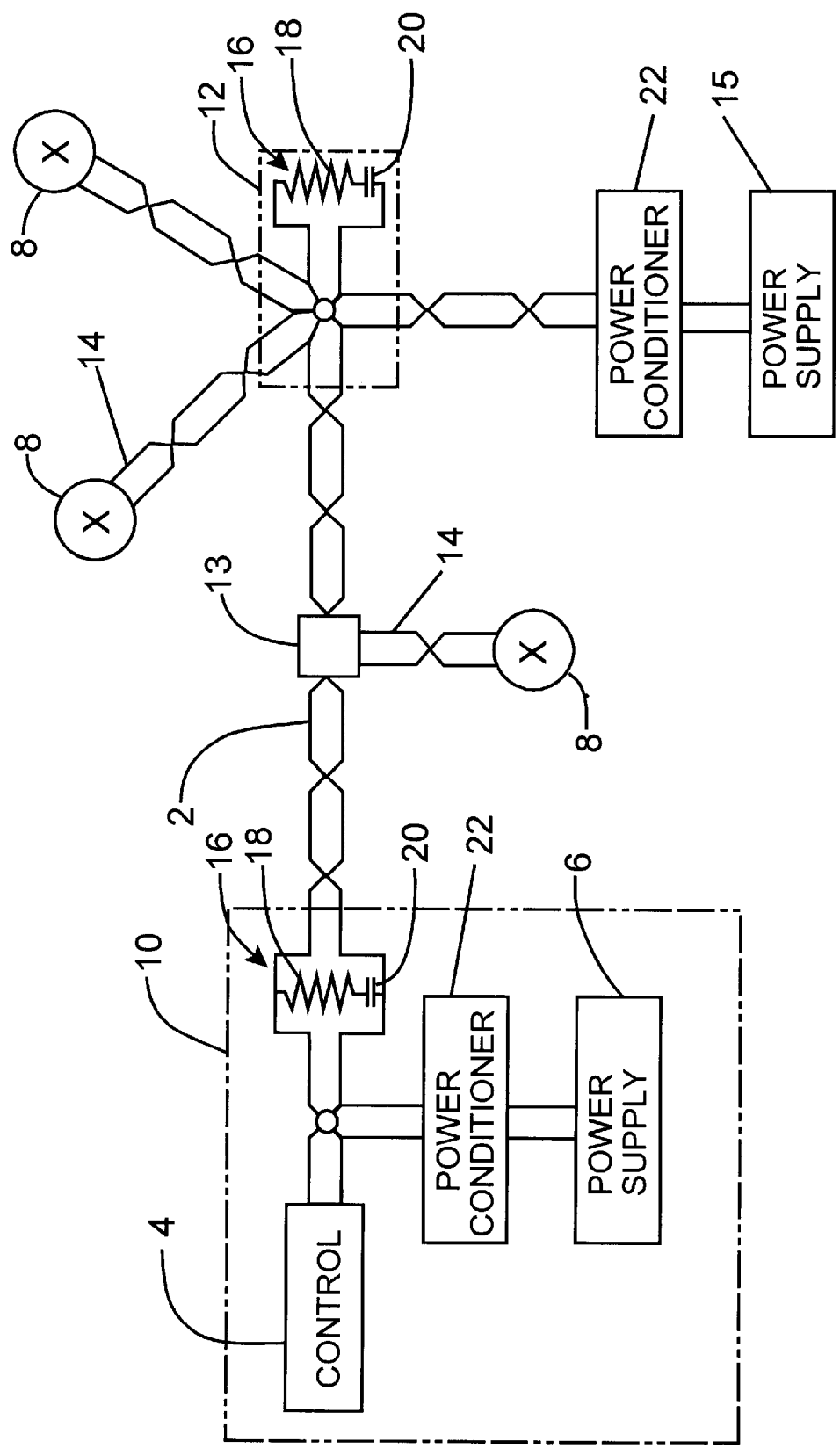
FIG. 1 is a schematic drawing of a fieldbus circuit.

Referring to FIG. 1, a typical fieldbus installation comprises a number of remotely located attached devices 8 (sensors, distributed controllers, and actuators) connected to a digital control system 4; often, but not necessarily, located in a control room 10; and a DC power supply 6 by a bus comprising a twisted pair cable referred to as the home run 2. Several devices 8 can be connected to the home run 2 by spur cables 14 at a connection referred to as a "chicken foot" 12. In addition, devices 8 can be attached along the home run cable 2 with spur cables 14 that are connected to the home run by a spur connector 13. For fieldbus installations with long wiring runs, an additional power supply 15 may be desirable. The resistance of a long wiring run may absorb sufficient power from the fieldbus to make powering remote devices from one point in the network impractical.

Termination is required at each end of the home run 2. To send a digital signal over the network, an attached device 8 varies the amount of current it draws from the bus. The terminators 16 comprise a resistor 18 of approximately the characteristic impedance of the wires of the bus and a capacitor 20 connected in series across the pair of wires of the home run cable 2. When the transmitting device 8 varies the current drawn from the bus, the voltage drop across the terminating resistor 18 changes producing the varying voltage of the digital signal. The capacitor 20 of the terminator prevents the flow of DC current through the terminator resistor 18 avoiding dissipation of power in the resistor while permitting the high frequency digital signal to be transmitted on the bus. In addition, the terminators serve to prevent signals from reflecting from the ends of the wires of the home run 2.

A power conditioner 22 is necessary to isolate the DC power supply 6 or 15 from the bus. The DC power supply 6 or 15 will attempt to maintain a constant output voltage and if connected directly to the bus would prevent the propagation of the varying voltage of the digital signal. To permit the digital signals and the DC voltage to exist simultaneously on the same wires, the present invention utilizes a power conditioner 22 comprising a current source connected between the output of the power supply 6 or 15 and the bus. The current source permits DC current to flow from the power supply 6 or 15 onto the bus 2 but blocks the passage of the high frequency digital signals from the bus to the output of the power supply. While the current source provides relatively constant current isolating the output of the power supply from the high frequency voltage variations of the digital communication signals, it has the capability of adjusting the output to adapt to longer term changes in the current requirements of the devices attached to the bus. The current source has the appearance of a large impedance in the bus circuit, similar to that of a large inductor, but is physically smaller, less costly and reduces the likelihood of circuit ringing, particularly when multiple power supplies are attached to the bus circuit.

Figure 2:
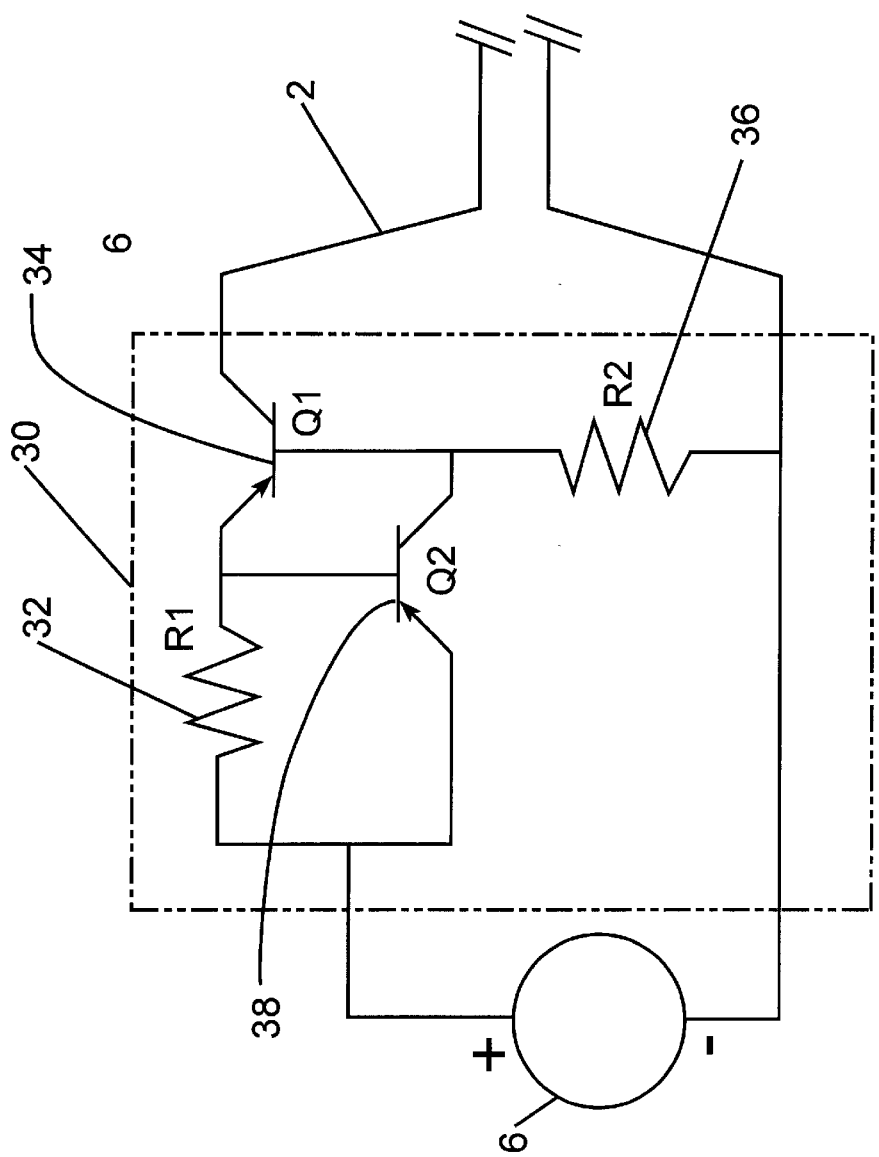
FIG. 2 is a schematic drawing of a constant current source according to the present invention.

A first embodiment of an isolating constant current source according the present invention is illustrated in FIG. 2. In this first embodiment of the current source 30, current from the power supply 6 flows through a first resistor (R1) 32 and a first pnp, bipolar transistor (Q1) 34 to the home run wiring of the fieldbus 2 when the first transistor (Q1) 34 is turned "ON." The first transistor (Q1) 34 is turned "ON" or conducts when current is drawn from its base through a second resistor (R2) 36 which is connected between the base of the first transistor (Q1) 34 and the negative side of the fieldbus circuit 2.

When current flows through the first resistor (R1) 32 a voltage drop develops across the resistor equivalent to the emitter-base junction voltage of a second transistor (Q2) 38. When the emitter-base junction voltage reaches or exceeds the threshold forward bias voltage ($v_{eb}$) of the second transistor (Q2) 38, the second transistor 38 is turned "ON." When the second transistor (Q2) 38 conducts, current flows from its collector and through the second resistor (R2) 36. As a result, the voltage drop through the second resistor (R2) 36 increases and the current flowing from the base of the first transistor (Q1) 34 decreases. This causes the first transistor (Q1) 34 to tend toward an "OFF" or non-conducting state increasing the resistance from its emitter to its collector, reducing current flow to the bus 2, and reducing the voltage drop across the first resistor (R1) 32. Equilibrium is obtained when the current flowing through the first resistor (R1) 32 produces a voltage drop equal to the threshold forward bias voltage ($v_{eb}$) of the second transistor (Q2) 38. As a result, the value of the first resistor (R1) 32 can be selected to permit a specific current flow through the current source 30 of the power conditioner. If the voltage in the wiring of the fieldbus 2 varies when the current source is in the current limiting mode, the current output of the current source 30 remains constant. Thus, the current source 30 has the appearance of large impedance isolating the output of the power supply 6 from the varying voltages of digital signals on the bus 2. However, the constant current resulting from use of a fixed first resistor (R1) 32 is of limited practicality because the current requirements of the devices attached to the network are seldom known without analysis of each specific network installation.

Figure 3:
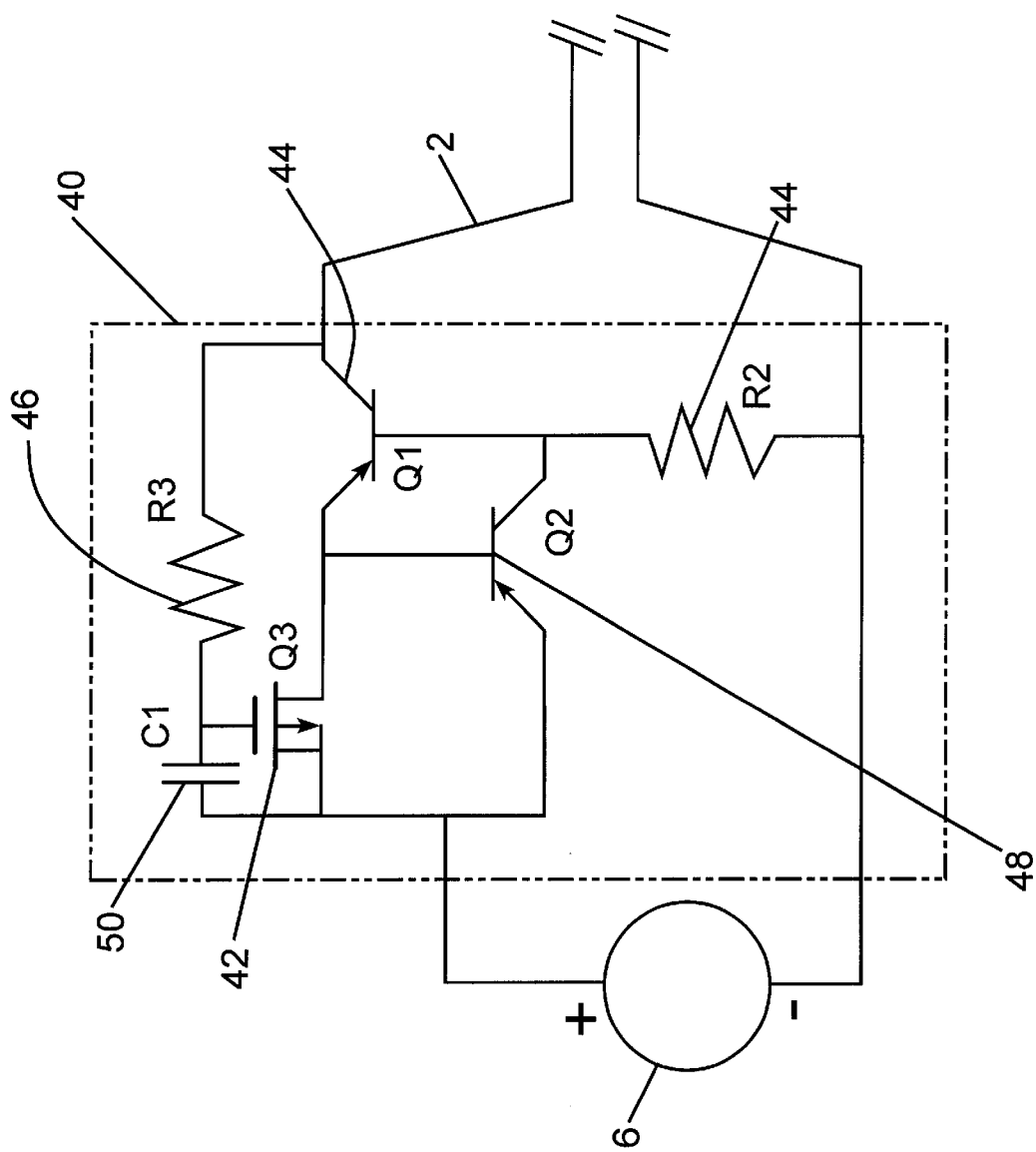
FIG. 3 is a schematic drawing of an adaptive constant current source according to the present invention.

Referring to FIG. 3, a second embodiment of the current source incorporates the capability of adapting to longer term changes in the current requirements of the bus. In this second embodiment the fixed first resistor (R1) of the first embodiment is replaced by a resistance which varies in response to relatively long term changes in the current requirements of the fieldbus but is unresponsive to the short term changes resulting from the high frequency digital signal. In the second embodiment, a P-channel, metal oxide field effect (MOSFET) third transistor (Q3) 42 replaces the first resistor (R1) of the first embodiment (see FIG. 2). A first transistor (Q1) 44 and the third transistor (Q3) 42 provide a conducting path with selective resistance for current flow from the output of the power supply 6 to the bus wiring 2. As in the first embodiment, the first transistor (Q1) 44 conducts when the threshold forward bias voltage ($v_{eb}$) is applied between the emitter and base. The bias voltage of the first transistor (Q1) 44 is controlled by the voltage drop across the second resistor (R2) 46 which is a function of the current conducted by the second transistor (Q2) 48. In this second embodiment of the invention, the operation of the second transistor (Q2) 48 is a function of the source to drain resistance of the third transistor (Q3) 42.

The source to drain resistance of the third transistor (Q3) 42 is determined by its source to gate voltage. When the voltage in the fieldbus wiring 2 is reduced, the gate voltage of the third transistor (Q3) 42 is drawn low through the resistor (R3) 46 and the source to drain resistance of the third transistor (Q3) 42 is reduced. As the source to drain resistance of the third transistor (Q3) 42 decreases, the emitter-base voltage of the second transistor (Q2) 42 decreases causing the second transistor (Q2) 48 to tend toward reduced conduction. This causes the first transistor (Q1) 44 to turn "ON" and conduct increasing amounts of current from the power supply to the fieldbus wiring 2. As current flow increases in the fieldbus wiring 2, the voltage drop across the resistor (R3) 46 decreases reducing the source to gate voltage of the third transistor (Q3) 42 and increasing its source to drain resistance. This tends to turn the second transistor (Q2) 48 "ON" which, in turn, tends to turn "OFF" the first transistor (Q1) 44 reducing the output of the current source 40. An equilibrium condition is attained when the source to gate threshold voltage of the third transistor (Q3) 42 is such that the source to drain voltage drop of the third transistor (Q3) 42 is equal to the threshold forward bias voltage ($v_{eb}$) of the second transistor (Q2) 48.

A capacitor (C1) 50 maintains a relatively constant source to gate voltage for transistor (Q3) 42 when the voltage of the fieldbus fluctuates during digital signaling. As a result, the source to drain resistance of the third transistor (Q3) 42, and therefore, the output of the current source remains relatively constant. If, on the other hand, the rate of change in voltage on the fieldbus wires 2 is relatively slow, as when an additional device is added to the network, the capacitor (C1) 50 will discharge through the resistor (R3) 46. As a result, the voltage at the gate of the third transistor (Q3) 42 will drop and the output of the current source will adjust to the increased current requirements of the fieldbus. The values of the third resistor (R3) 46 and the capacitor (C1) 50 are selected such that the output of the current source 40 remains constant at a threshold frequency somewhat below the frequency of the communication signal specified for the fieldbus. The adaptive current source has the appearance of a large impedance in the circuit preventing the high frequency communication signals from reaching the output of the power supply.

Figure 4:
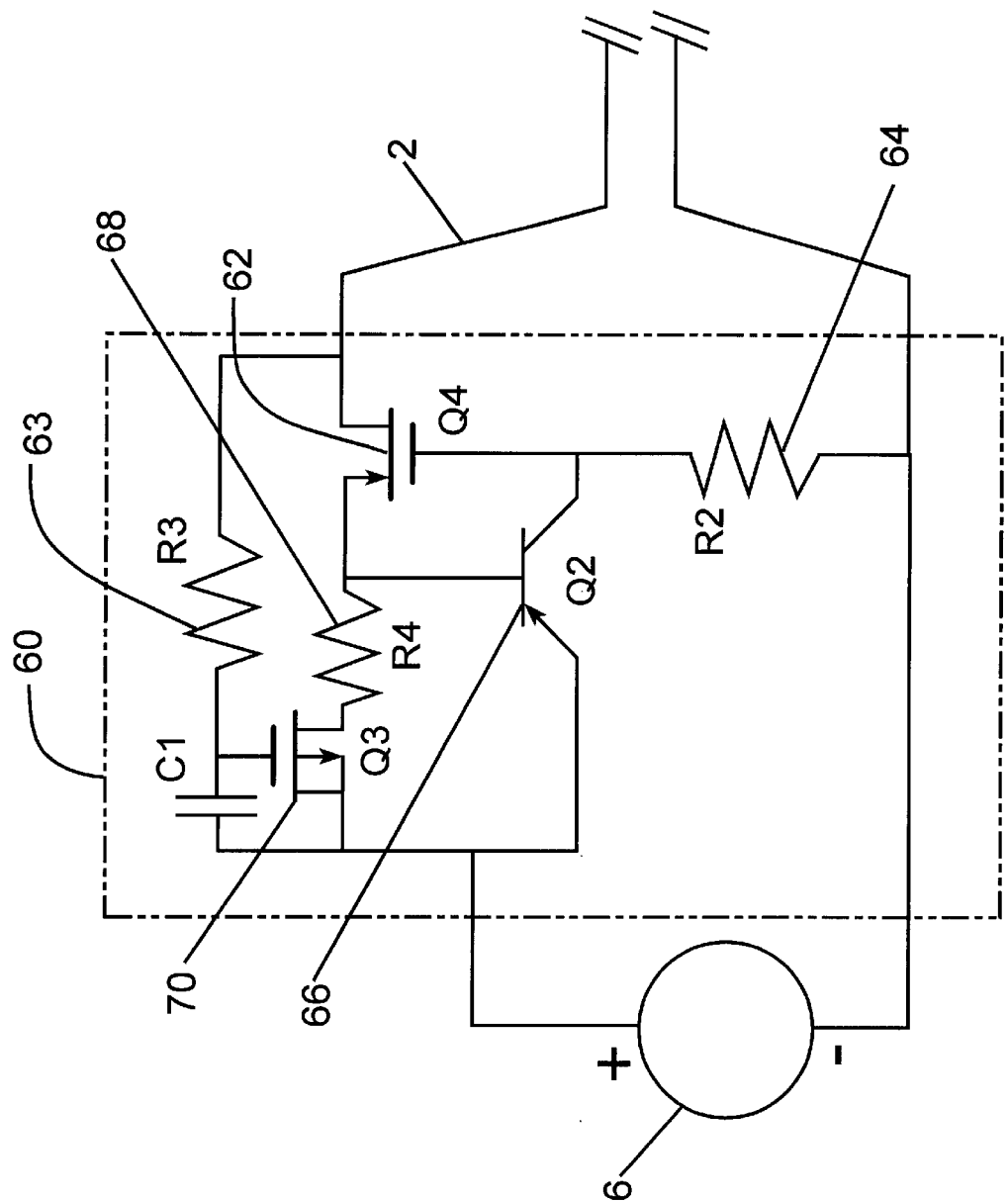
FIG. 4 is a schematic drawing of an adaptive current source according to the present invention employing MOSFET transistors and including over current protection.

A third embodiment of the current source is illustrated in FIG. 4. In this third embodiment, the pnp, bipolar transistor (Q1) of the first and second embodiments is replaced with a field effect transistor (Q4) 62. The field effect transistor requires much less gate current than a bipolar transistor. As a result, the resistance of the bias resistor (R2) 64 can be increased reducing the amount of power dissipated in sinking the current of the second transistor (Q2) 66.

The third embodiment of the invention also incorporates over current protection in the event that the field bus wiring should be shorted. Over current protection is provided by adding a fixed, over current protection resistor (R4) 68 between the drain of the third transistor (Q3) 70 and the base of the second transistor (Q2) 66. In the event of a short in the fieldbus wiring 2, the source to drain resistance of the third transistor (Q3) 70 will drop very low. However, the maximum emitter-base voltage of the second transistor (Q2) 66 will limited by the resistance of the over current protection resistor (R4) 68. As a result, the first transistor (Q4) 62 will not be turned fully "ON" and the current flow through the adaptive current source will be limited.

Figure 5:
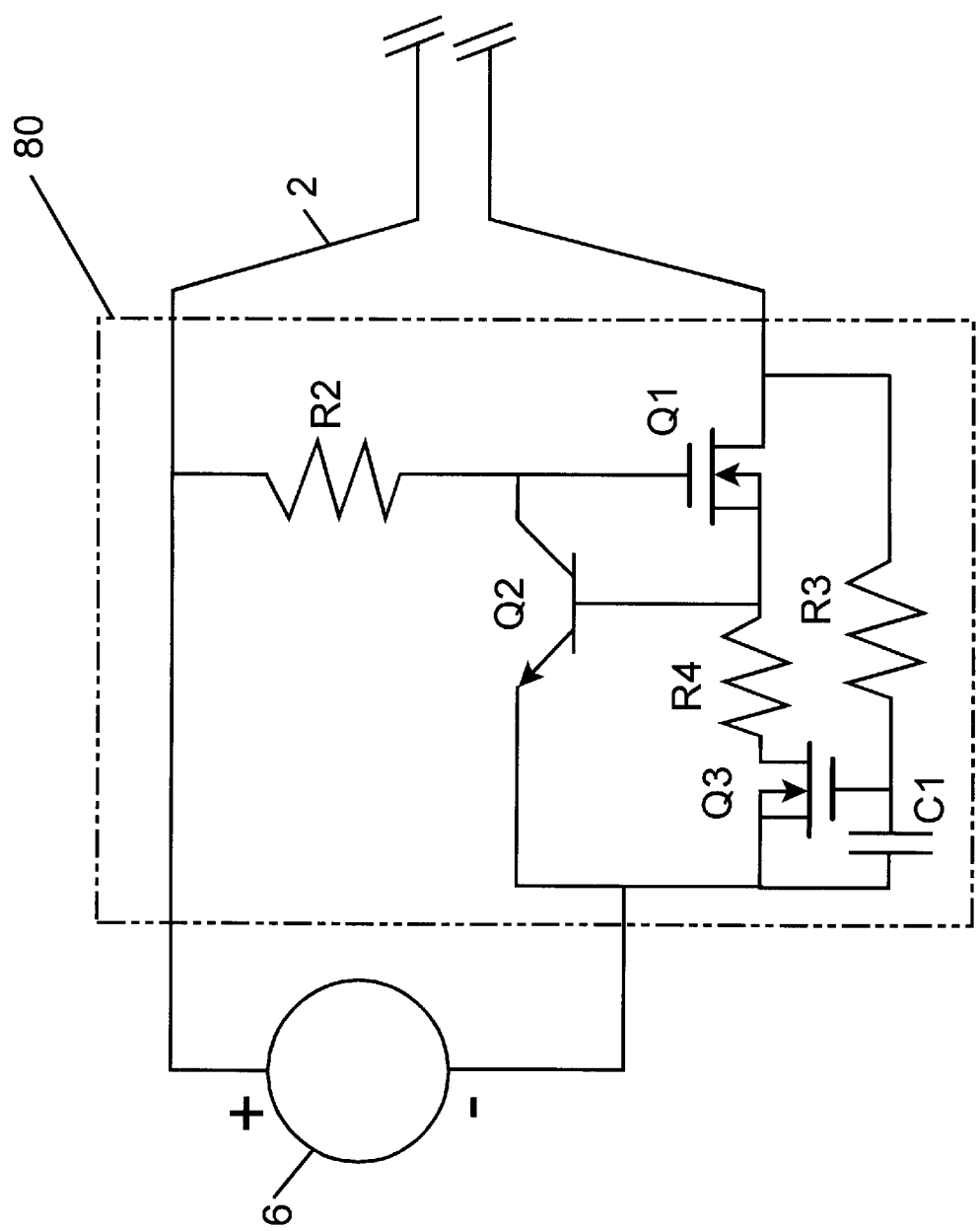
FIG. 5 is a schematic drawing of an adaptive current source according to the present invention employing N-channel MOSFET transistors, npn-bipolar transistors, and including over current protection.

While all embodiments of the current source can be constructed with pnp bipolar transistors and P-channel field effect transistors as illustrated in FIGS. 2–4, the current source can also be constructed using npn, bipolar transistors and N-channel field effect transistors. An adaptive, constant current source 80 including over current protection, similar to the current source illustrated in FIG. 4 but constructed with NPN, bipolar and N-channel field effect transistors, is illustrated in FIG. 5. This current source is connected to the negative side of the fieldbus wiring 2 and the power supply 6.

Figure 6:
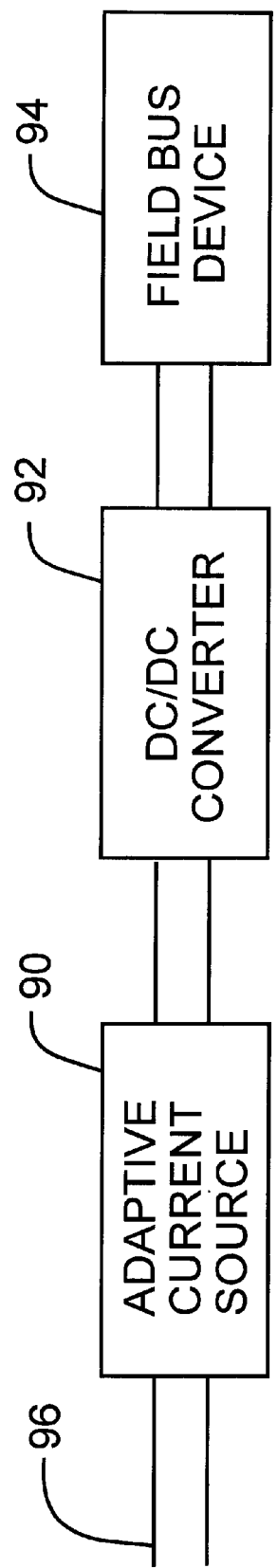
FIG. 6 is a block diagram illustrating use of an adaptive constant current source for isolation of the input a DC/DC converter supplying power to a device attached to a fieldbus.

Referring to FIG. 6, the adaptive current source 90 of the present invention can also be used as a power conditioner to isolate the input to devices attached to the fieldbus. The ISA standard provides for supplying a DC power voltage between 9 and 32 volts to the fieldbus. However, many attached devices require a lower internal voltage. A DC/DC converter 92 can be used to change the voltage supplied by the bus wiring 96 to the voltage required internally by the attached device 94. However, the converter 92 has a low impedance and, like the power supply, would absorb the digital signals from the bus if not isolated. The adaptive constant current source 90 can be used to provide high impedance to isolate the input of a DC/DC converter 92 from the varying voltage of the digital signals on the bus wiring 96.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A power conditioner for use in combination with a DC power source having a first terminal and a second terminal, said first terminal connected to a first wire of a two wire bus carrying an imposed AC signal, said power conditioner comprising:
   (a) a first transistor having an emitter, a collector connected to a second wire of said two wire bus, and a base conductively connected to said first terminal of said power source;
   (b) a field effect transistor having a source conductively connected to said second terminal of said power source, a drain conductively connected to said emitter of said first field effect transistor, and a gate capacitively connected to said second terminal of said power source and conductively connected to said collector of said first transistor; and
   (c) a third transistor biased to conduct between said second terminal of said power source and said base of said first transistor in response to a voltage at said emitter of said first transistor.

2. The apparatus of claim 1, wherein said third transistor comprises a bipolar transistor having an emitter conductively connected to said second terminal of said power source, a collector conductively connected to said base of said first transistor and a base conductively connected to said emitter of said first transistor.

3. A power conditioner for use in combination with a DC power source having a first terminal and a second terminal, said first terminal connected to a first wire of a two wire bus carrying an imposed AC signal, said power conditioner comprising:
   (a) a first field effect transistor having a source, a drain connected to a second wire of said two wire bus, and a gate conductively connected to said first terminal of said power source;
   (b) a second field effect transistor having a source conductively connected to said second terminal of said power source, a drain conductively connected to said source of said first field effect transistor, and a gate capacitively connected to said second terminal of said power source and conductively connected to drain of said first field effect transistor; and
   (c) a third transistor biased to conduct between said second terminal of said power source and said gate of said first field effect transistor in response to a voltage at said source of said first field effect transistor.

4. The apparatus of claim 3 wherein said third transistor comprises a bipolar transistor having an emitter conductively connected to said second terminal of said power source, a collector conductively connected to said gate of said first field effect transistor and a base conductively connected to said emitter of said first field effect transistor.

5. The apparatus of claim 3 wherein a voltage between said second terminal of said power source and said gate of said third transistor is limited by a resistor.

6. A power conditioner for use in combination with a DC voltage converter having a first terminal and a second terminal, said first terminal connected to a first wire of a two wire bus carrying an imposed AC signal, said power conditioner comprising:
   (a) a first transistor having an emitter, a collector connected to a second wire of said two wire bus, and a base conductively connected to said first terminal of said voltage converter;
   (b) a field effect transistor having a source conductively connected to said second terminal of said voltage converter, a drain conductively connected to said emitter of said first field effect transistor, and a gate capacitively connected to said second terminal of said voltage converter and conductively connected to said collector of said first transistor; and
   (c) a third transistor biased to conduct between said second terminal of said voltage converter and said base of said first transistor in response to a voltage at said emitter of said first transistor.

7. The apparatus of claim 6 wherein said third transistor comprises a bipolar transistor having an emitter conductively connected to said second terminal of said voltage converter, a collector conductively connected to said base of said first transistor and a base conductively connected to said emitter of said first transistor.

8. A power conditioner for use in combination with a DC voltage converter having a first terminal and a second terminal, said first terminal connected to a first wire of a two wire bus carrying an imposed AC signal, said power conditioner comprising:
   (a) a first field effect transistor having a source, a drain connected to a second wire of said two wire bus, and a gate conductively connected to said first terminal of said voltage converter;
   (b) a second field effect transistor having a source conductively connected to said second terminal of said voltage converter, a drain conductively connected to said source of said first field effect transistor, and a gate capacitively connected to said second terminal of said voltage converter and conductively connected to drain of said first field effect transistor; and
   (c) a third transistor biased to conduct between said second terminal of said voltage converter and said gate of said first field effect transistor in response to a voltage at said source of said first field effect transistor.

9. The apparatus of claim 8 wherein said third transistor comprises a bipolar transistor having an emitter conductively connected to said second terminal of said voltage converter, a collector conductively connected to said gate of said first field effect transistor and a base conductively connected to said emitter of said first field effect transistor.

10. The apparatus of claim 8 wherein said a voltage between said second terminal of said power source and said gate of said third transistor is limited by a resistor.

* * * * *

UNITED STATES PATENT AND TRADEMARK OFFICE
CERTIFICATE OF CORRECTION

PATENT NO. : 6,525,915 B1 Page 1 of 1
APPLICATION NO. : 09/329861
DATED : February 25, 2003
INVENTOR(S) : Maris Graube It is certified that error appears in the above-identified patent and that said Letters Patent is hereby corrected as shown below:

In the Abstract:

Line 9 — "the output the constant voltage" should read --the output and the constant voltage--.

In the Specification:

Column 4, line 41 — "according the present invention" should read --according to the present invention --.

Column 6, line 31 — "66 will limited by the" should read --66 will be limited by the--.

Signed and Sealed this

Eighteenth Day of July, 2006

JON W. DUDAS
*Director of the United States Patent and Trademark Office*